(12) United States Patent
Vandergheynst et al.

(10) Patent No.: US 7,509,731 B2
(45) Date of Patent: Mar. 31, 2009

(54) METHOD AND DEVICE FOR MANUFACTURING NON-CONTAMINATED MOX FUEL RODS

(75) Inventors: Alain Vandergheynst, Dour (BE); Jean Heylen, Mol (BE); Louis Aerts, Mol (BE)

(73) Assignee: Belgonucleaire SA, Brussels (BE)

( * ) Notice: Subject to any disclaimer, the term of this patent is extended or adjusted under 35 U.S.C. 154(b) by 661 days.

(21) Appl. No.: 10/540,032

(22) PCT Filed: Dec. 24, 2002

(86) PCT No.: PCT/BE02/00200

§ 371 (c)(1),
(2), (4) Date: Jun. 22, 2005

(87) PCT Pub. No.: WO2004/059657

PCT Pub. Date: Jul. 15, 2004

(65) Prior Publication Data

US 2007/0079496 A1  Apr. 12, 2007

(51) Int. Cl.
| B23P 19/00 | (2006.01) |
| B21B 1/46 | (2006.01) |
| B23Q 17/00 | (2006.01) |
| G21C 19/00 | (2006.01) |

(52) U.S. Cl. .................. 29/723; 29/527.1; 29/407.06; 376/261

(58) Field of Classification Search ............... 29/527.1, 29/723, 407.01, 407.06, 407.09; 376/261; 53/542, 77, 126, 258; 976/DIG. 286; 414/292; 228/135; 148/516

See application file for complete search history.

(56) References Cited

U.S. PATENT DOCUMENTS 4,243,078 A * 1/1981 Sahlin ........................... 141/1
6,577,698 B1 * 6/2003 Boonen et al. ............... 376/261

* cited by examiner

*Primary Examiner*—John C Hong
(74) *Attorney, Agent, or Firm*—Sughrue Mion, PLLC

(57) ABSTRACT

The invention relates to a method and device for production of non-contaminated rods from MOX tablets in columns, within a confinement chamber divided into compartments, by means of a centering and aligning element for the tablets and a long pushrod with a sensitive drive.

20 Claims, 8 Drawing Sheets

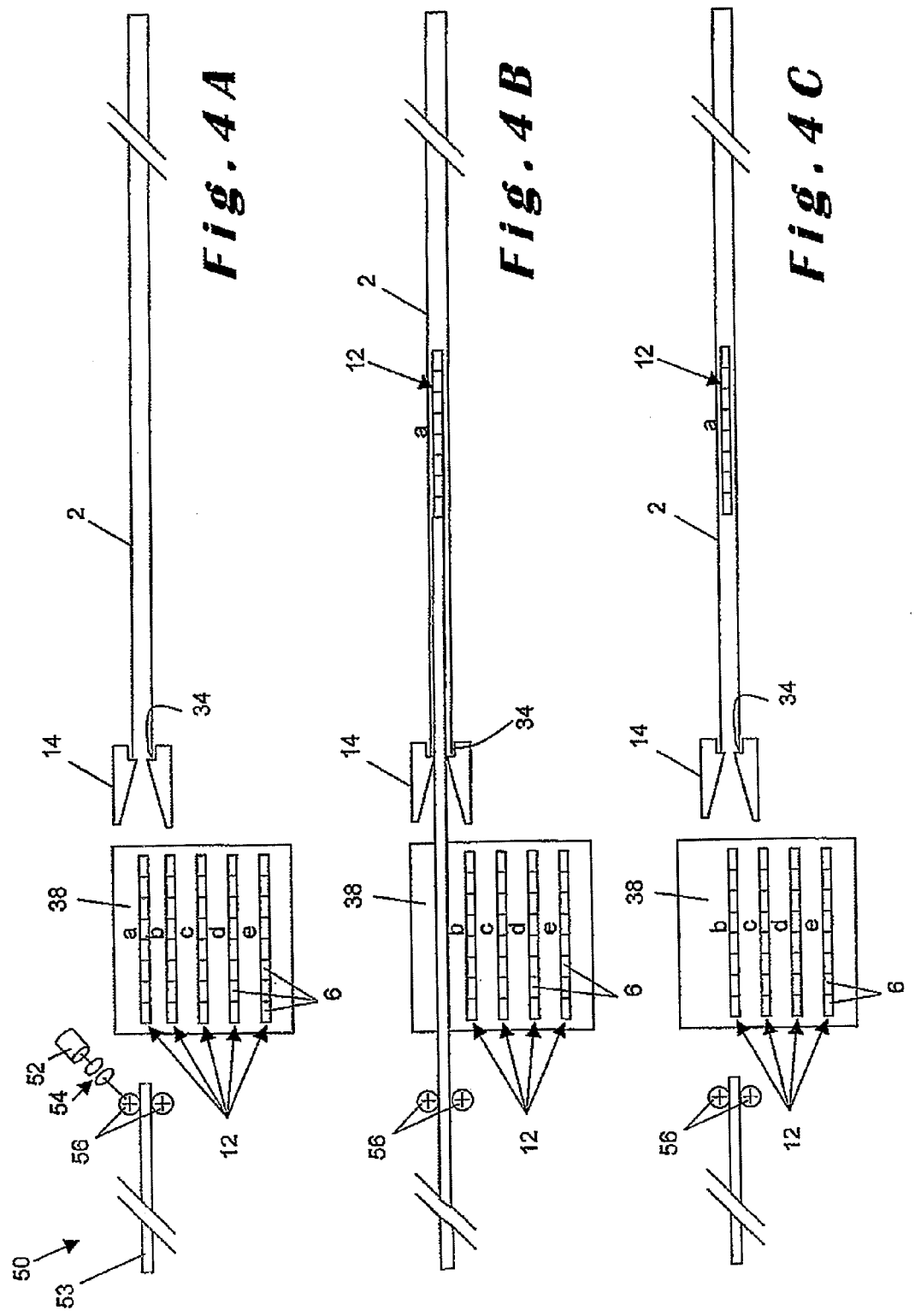

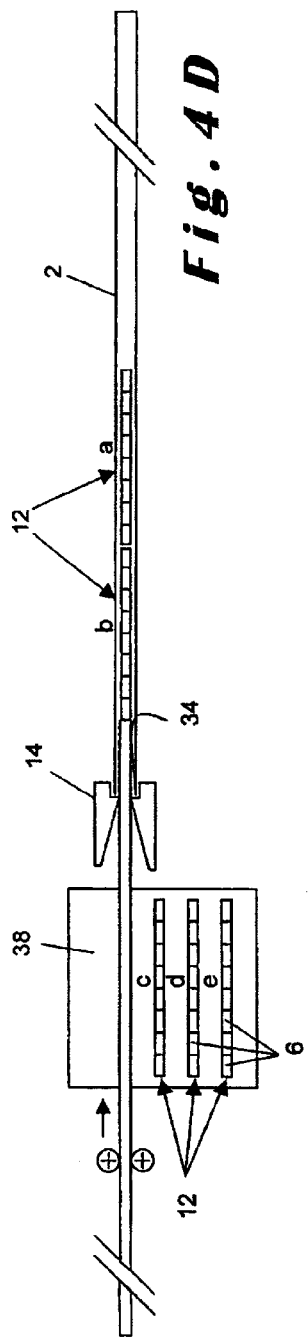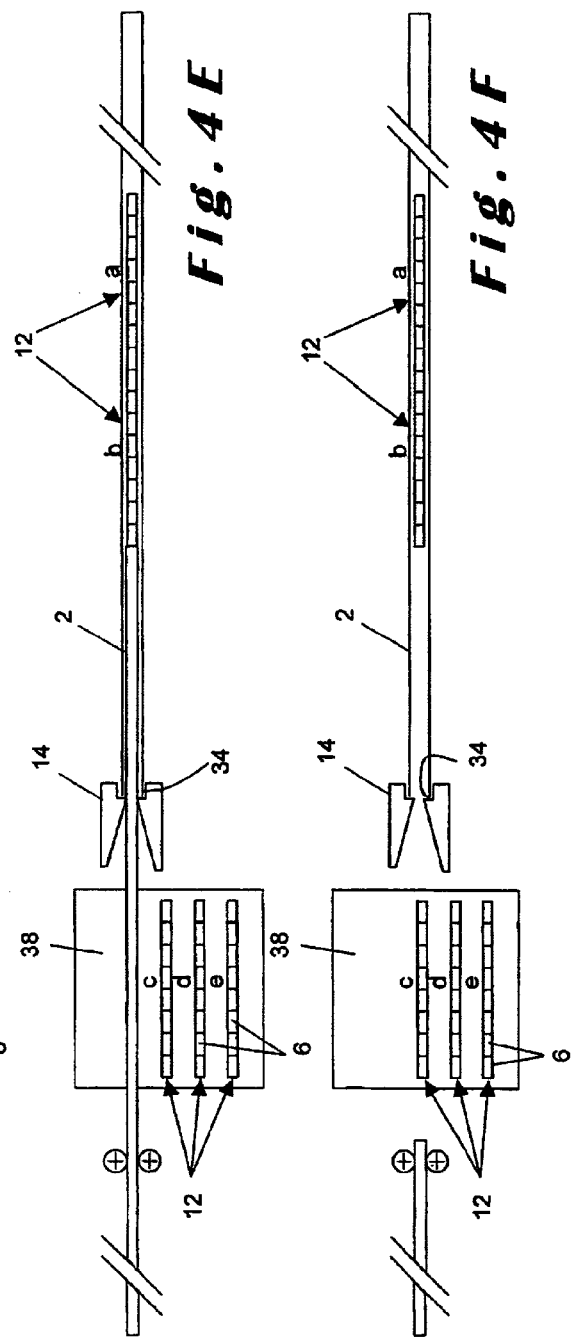

METHOD AND DEVICE FOR MANUFACTURING NON-CONTAMINATED MOX FUEL RODS

SCOPE OF THE INVENTION

The present invention relates to a method for manufacturing non-contaminated MOX fuel rods, from pellets, in a containment enclosure under a depression, the method comprising the following operations for one rod:
- loading of the pellets in successive columns into a cladding previously provided with a first plug at one of its two ends;
- loading of various structural components, in particular a retaining spring;
- fitting of a second plug at the other end of the cladding;
- peripheral welding of said second plug; and
- at least one cleaning and at least one checking of the contamination of the parts of said cladding or respectively of the rod which have been exposed to possible contamination.

Recycling of plutonium, originating from reprocessing of nuclear fuels for civil use or resulting from nuclear weapons disposition programmes, by the manufacture of fresh uranium/plutonium Mixed OXide (MOX) fuel for commercial nuclear reactors, is in the process of being industrialised and spread worldwide.

Industrialisation lies, among other things, through
- automation of manufacturing operations;
- limitation of the exposure of operating personnel to ionising radiation; and
- reduction of liquid and solid effluents.

The worldwide spread sees this recycling technology accessed by the major powers, whether political, economic or demographic (US, Japan, Russia, India, China, etc.). Western Europe maintains a certain lead in the development of industrial processes in this field.

The search for competitiveness by electricity producers, related to the liberalisation of their market, drives nuclear fuel designers to limit the frequency of refuelling of reactor cores, by striving for continually increasing burn-ups of the fuel at defuelling time, for both $UO_2$ fuel and MOX fuel (for example, 50 GWd/t). This has the consequence of aiming for the production of MOX fuels with a higher fissile plutonium content, and with civil plutoniums of increasingly degraded isotopic composition, that is to say fuels with a constantly increasing alpha activity.

For controlling the safety of MOX fuel manufacturing plants (prevention of risks of ingestion/inhalation by the operators), safety of transport and the safety of nuclear power reactors (non-contamination of the primary circuits), it is important that the MOX fuel rods loaded in assembly form are not or are only very slightly contaminated on the external surface of their cladding, which provides, with its welded end plugs, the containment of the MOX pellets.

The present invention relates to operations for manufacturing MOX fuel rods, in particular operations for loading highly contaminated pellets into the cladding, and for fitting and welding the second end plug, and relates to methods and devices for industrially producing non-contaminated MOX fuel rods, without it being necessary to resort to chemical or electrolytic decontamination operations by a wet method, which are polluting and have increased risks of criticality.

As a reminder, a nuclear fuel rod generally consists of a metal cladding (most often made from a zirconium alloy or stainless steel), fuel pellets (most often made from uranium oxide or uranium/plutonium oxide), a retaining spring and two welded end plugs which provide tightness to gases and containment of the nuclear materials. These rods are filled with a conductive inert gas (most often helium), pressurised or not. The gap between pellets and cladding is very limited (for example, of the order of 150-200μ for light-water reactors). Structural components other than the retaining spring cited above can be loaded at the head or foot of the rod (for example an inset tube, isolation pellets, "getters", blanket pellets, etc.).

During the manufacture of fuel rods, it is important that the method for loading the pellets into the cladding
- limits the cladding parts exposed to contamination and the magnitude of this contamination, for the purposes of limiting, perhaps even avoiding, cleaning/decontamination operations; in particular, avoids incrustation of contamination in the external surface of the cladding, in particular in the open end face constituting the weld seam of the second plug, these possible incrustations contributing towards increasing the proportion of rods discarded through not meeting the external contamination criteria;
- avoids stressing the ceramic pellets beyond what is necessary, for the purposes of avoiding the production of chips generating mechanical blockages during loading, and the production, following the possible introduction of these chips into the cladding, of defective rods owing to excessive gaps between successive pellets.

PRIOR ART

The manufacture of nuclear fuel rods, in particular MOX fuel rods, therefore comprises various operations already cited, which it is useful to recall before describing the prior art, such as has been made public and is known to the inventors. These operations are generally carried out in containment enclosures providing protection of the environment and the operators against α (and also β,γ) emitters:
- presentation of a cladding equipped with its first tight plug;
- loading of the pellets into the cladding;
- loading of the pellet compression spring;
- replacement of the air in the cladding with an inert gas;
- cleaning/decontamination of the part of the cladding exposed to contamination during loading of the pellets;
- fitting of the second plug;
- peripheral welding of the second plug;
- possible pressurisation of the cladding, separately or at the same time as the preceding welding;
- possible welding of a pressurisation hole, in the case of separate pressurisation;
- measurement of the contamination of the part of the cladding exposed to contamination.

The techniques implemented by manufacturers aim to meet various objectives which can sometimes be contradictory. A few non-limitative examples can be cited:
- operating safety: in particular, limitation of the risk of criticality related to the use of neutron moderator liquids, and of the fire/explosion risk, by exclusion of volatile cleaning solvents; containment of radioactive materials, in particular α emitters, in tight enclosures, of glove box type for example;
- quality of the fuel rod produced: in particular, quality of the welding (absence of oxidation, of inclusions, etc.), absence of chips generating gaps between pellets, no fixed or transferable external contamination;
- industrialisation of manufacturing operations: automation of operations; productivity; limitation of the exposure of operators to ionising radiation (external or internal exposure); limitation of solid and liquid effluents produced during cleaning/decontamination operations.

The striving for these objectives can lead to the choice of a particular order for carrying out the operations described above, or to particular technological options for carrying out such and such an operation in order to facilitate all these operations, as regards safety, efficiency or effluent limitation, or to improve the quality of the products. A few techniques which have an influence on the MOX fuel manufacturing processes are cited below:

- control of the accumulation of dust on the pellets before filling, by wet or dry grinding, by removal of dust from the pellets by mechanical means or by laser, by limiting the fraction of recycled discards in the pellets, by gentle handling of the pellets, etc.;
- loading of the pellets into a cladding under air or nitrogen, which necessitates diluting said air or nitrogen by multiple fillings with inert gas or evacuating the cladding in order to next introduce therein the inert gas and, in doing this, contaminating the open end of the rod (already provided or not with its second plug);
- placing of a second plug with tightening or not, welded circumferentially by the most widespread process, TIG (Tungsten Inert Gas), which permits pressurisation in another work line or another machine; alternatively, a welding process providing welding of the second plug and pressurisation in a single operation (resistance or laser welding).

Various existing inventions connected with the field of the present invention are summarised below, by way of non-exhaustive examples, according to which there is use of a centring device for introduction of the pellets into the cladding, in the absence of particular containment devices (of the glove box type):
- fixed centring of cylindrical/truncated cone shape (see U.S. Pat. Nos. 4,980,119, 4,748,798, 5,251,244);
- triple centring (one fixed+two intermediate) of circular cross-section (see U.S. Pat. No. 3,940,908);
- fixed V-shaped centring (see U.S. Pat. No. 3,907,123);
- fixed centring with polygonal or square cross-section (see U.S. Pat. No. 4,942,014); or use of a centring device for introduction of the pellets into the cladding, mounted in a containment enclosure (of the glove box type):
- truncated cone-shaped fixed centring mounted at the centre of the enclosure (see U.S. Pat. No. 3,925,965);
- centring mounted at the limit of the two areas, active and inactive, of the containment enclosure, the active area being reserved for loading of the pellets (see WO 98/26428).

It should be noted that the last document mentions the division of the enclosure into only two compartments.

All the above devices known to the inventors do not meet the requirements related to the industrial manufacture of non-contaminated MOX rods from ceramic pellets, which, besides their accumulation of dust, generate chips of all shapes and sizes, themselves generating mechanical jamming and blockages during the loading operations;

- either these devices do not limit the part of the cladding exposed to contamination to the strict minimum, or there is no management of the levels of contamination in the containment enclosure (from the highly contaminated in the loading area to the very slightly contaminated or not contaminated when the rod leaves the containment enclosure), this absence of management leading to excessive and unnecessary contamination, which must be eliminated by additional operations most often based on liquid processes generating various effluents and additional risks of criticality;
- or these devices are sensitive to the dust and chips conveyed by the pellets in columns and/or to those generated specifically during the operation of loading into the cladding, this sensitivity resulting in mechanical blockages, generating machine stoppages, operator interventions in containment enclosures, risks of contamination of the operators, of the workshops and even sometimes of the enclosure compartments, which ought to remain only slightly or non-contaminated;
- or these devices for managing the contamination and for loading the pellets do not allow the manufacture of plutonium-based rods conforming to their non-contamination specification, when the plutonium content of the pellets and the alpha activity of the plutonium are high, even at the cost of an additional liquid decontamination operation.

PRESENTATION OF THE INVENTION

The aim of the present invention is to remedy the drawbacks cited above, and others well known to persons skilled in the art, and is based to that end on various methods which have an influence in particular on the implementation of the manufacturing operations as well as on the quality of the manufactured products, following a particular, novel and inventive combination of these operations and methods. Thus:

- the various operations of loading of the pellets, cleaning/decontamination of the end of the cladding exposed to contamination, placing of the spring and fitting of the second plug (without or with immediate welding of the second plug, depending on whether said plug is mounted with tightening or not), cleaning, and measurement of non-contamination before withdrawal of the rod out of the enclosure can be carried out mainly in one and the same work line and in different enclosure compartments kept isolated from one another according to the atmosphere and the level of contamination of the corresponding operation; the last two compartments cited at least being advantageously designed so that their contamination can be maintained at a low level on a long-term basis (for example, by having a plugacity for decontamination, well known to persons skilled in the art) during operation, despite the successive transfers of many rods;
- preferentially, the parts of the cladding introduced into the containment enclosure are limited to what is strictly necessary, for the purposes of limiting the parts exposed to contamination and liable to a contamination check at the exit and a possible cleaning/decontamination operation;
- preferentially, loading of the pellets takes place with pellets previously introduced into a containment enclosure under helium or a vacuum and into a cladding previously filled with helium or under vacuum, by prior pumping out of the contained air. On account of the very low dynamic viscosity of helium, it is possible to load the pellets into the cladding under helium at industrial speeds (of the order of 100-150 mm/sec), without the evacuation of the gas contained in the cladding significantly carrying dust towards the open end of the rod;
- introduction of the pellets into the cladding—or loading—is provided by an introduction device with a circular truncated pyramid-shaped internal geometry and precise tolerances, for the purposes of:

presenting, at the open end of the cladding, the pellets perfectly aligned position-wise and orientation-wise in order to avoid mechanical jamming;

masking the open end of the cladding from the pellets in the process of being introduced in order to avoid the massive contamination of said cladding, a possible incrustation of contamination and additional mechanical blockages;

trapping and/or collecting and/or forcing back the dust and chips which might lead to jamming of the pellets during their introduction or be introduced into the cladding;

loading of the pellets into the cladding is provided in columns presented successively on a V-shaped component in the axis of the cladding, using a device, for the purposes of limiting the forces on the pellets, with sensitive drive, the force of which is limited according to the order of the column of pellets in the process of being loaded, and of sufficient length so that the depth of introduction of a column inside the cladding is greater than the length of the next column to be loaded; it must be noted that the forces for pushing the pellets during loading into the cladding are limited according to both the depth of introduction of the pushing device and the order (N) of the column in the process of being loaded;

the operations for cleaning the parts of the cladding exposed to contamination are provided immediately after the contamination has taken place, and in a dry manner, for the purposes of avoiding propagation of the contamination and controlling the risk of criticality and the production of contaminated liquid effluents.

At least, a partial combination of the above novel operations and methods is necessary for overcoming the drawbacks mentioned previously.

To that end, the method of the invention comprises an organisation in steps as follows:

division of the containment enclosure into a number of successive compartments;

connection of each compartment to its neighbour for a sealed passage for the cladding, at least certain of said passages being aligned in order to allow a movement of the cladding along its longitudinal axis;

introduction of the cladding to be loaded, the open end in front, into a first compartment through a sealed passage or an input aperture thereto;

axial driving of the cladding between successive compartments until its open end reaches the last compartment;

loading of the pellets in the last compartment, and if applicable also various structural components other than the retaining spring, into the cladding through its open end;

partial axial withdrawal of the cladding, when the loading is finished, so as to convey its open end into a preceding compartment;

in this preceding compartment, cleaning and a possible contamination check of at least the part of the cladding exposed to contamination by the pellets in the process of being loaded or by the atmosphere of the last compartment;

after this cleaning, axial movement of the cladding so that its open end is positioned in another compartment;

loading of the retaining spring and fitting of the second plug in the open end, in this other compartment;

after this fitting, carrying out of possible other operations (for example, circumferential welding, pressurisation/producing a pip, etc.) in the same compartment or in yet another compartment, with a possible additional movement of the cladding;

contamination checking of the parts of the rod exposed to the contamination of the last compartments and possible cleaning if necessary, in the first or the second compartment;

withdrawal of the rod out of the first compartment or a transverse transfer to another containment enclosure via this first compartment connecting the enclosures to one another;

stepping of the contaminations between the various compartments, starting from the non-contaminated or the very slightly contaminated in the first compartment to the most contaminated in the last compartment;

selection of gases supplying the containment enclosure compartments (and any process or transfer enclosures present therein), chosen from amongst the group formed by: air, nitrogen, helium, argon, vacuum; and stepping of the depressions in the compartments, in order to organise any leaks, from the weakest depression in the first compartment to the strongest in the last compartment.

The above method forming the subject of the invention can usefully be implemented in isolation or in combination in both conventional MOX fuel manufacturing plants and plants for manufacturing another nuclear fuel containing a proportion of actinides other than uranium (by way of non-limitative examples: fuel based on nitrides or carbides of uranium/plutonium, fuel with no fertile material intended for incinerating actinides, MOX based on thorium/plutonium, MOX with poison, burnable or not, etc.).

According to one embodiment of the invention, for loading of the pellets and the following associated operations presenting, centring and aligning the pellets of a column from a support to the open end of the cladding; and eliminating from the column of pellets the dust and chips conveyed by and/or adhering to the pellets loaded, and/or generated by the presentation, centring and alignment operations, the following are performed:

correction of off-centrings between the support and the open end of the cladding, and alignment of the axis of the pellets with the axis of the cladding, by means of a channel, the bottom of which has a V-shaped profile in a continuous ramp and intersecting with a cylindrical output with the diameter of the pellets;

centring of the cladding in a chamber centred on the cylindrical part of the channel;

masking of the open end of the cladding from the pellet in the process of being loaded;

trapping and/or collection and/or forcing back of dust and chips, via the free sections between pellets and walls of the channel, by gravity deposition and optionally by additional blowing and/or suction.

The present invention also relates to a device for manufacturing non-contaminated MOX fuel rods from pellets, for implementation of the method of the invention. This device comprises a containment enclosure for carrying out the following operations:

loading of the pellets in columns into a cladding open at one end and closed by a first plug at the other;

cleaning and possible checking of the contamination of the part of said cladding which has been brought into contact with contamination or dust from said pellets;

loading of various structural components, in particular a retaining spring;

fitting of a second plug;

possible cleaning and checking of the contamination of the part of said cladding which has been brought into contact with contamination.

According to the invention, in said device:

the containment enclosure is divided into a number of distinct compartments;

the compartments are preferentially in succession one after the other in a direction of movement between compartments of a cladding to be loaded, the open end in front;

the compartments of the enclosure are isolated from one another by tight partitions having, for passing the cladding from one compartment to another, a passage consisting of a full-passage valve and a sealing device on the circumference of the cladding, at least certain of said passages being aligned in the direction of movement of the above-mentioned cladding, the first compartment encountered possibly being simply provided with an aperture at its input;

an axial driving mechanism is arranged in order to move along its longitudinal axis the end of the introduced cladding or of the rod provided with its second plug in the selected compartment;

devices for loading the pellets in columns and means of loading various structural components other than the retaining spring and the second plug are installed in the last compartment;

at least one device for cleaning/decontamination and possible means of checking contamination of the part of the cladding exposed to contamination during loading of the pellets are installed in a preceding compartment;

means of loading the retaining spring and of fitting—with tightening or not—the second plug in the open end of the cladding are installed in another preceding compartment;

means necessary for carrying out possible additional welding and/or pressurisation operations can be installed in the same compartment or in yet another compartment;

means of checking contamination and possibly of cleaning/decontaminating the parts of the rod exposed to contamination during the preceding operations are installed in the first or second compartment; and means of ventilating the containment enclosure, its compartments and any enclosures installed therein, and gas supply means, are installed in order to maintain the enclosure at a depression compared with the atmosphere of the room and are arranged to provide a selection of gas for each compartment and/or enclosure installed therein, chosen from amongst the group formed by: air, nitrogen, helium, argon, vacuum; and stepping of the depressions of the compartments—for the purposes of organising the direction of any leaks and contributing towards the stepping of the contaminations—from the weakest in the first compartment to the strongest in the last compartment.

As indicated, the various compartments can have in addition one or more enclosures installed therein—or internal chambers—and operating under gas atmospheres differing from the atmosphere of the compartment, these enclosures or chambers generally being intended for process operations (for example, loading the pellets under vacuum, welding under helium of very high purity, etc.) or handling operations (for example, transverse transfer in a drum of the open end of the claddings under controlled atmosphere).

ADVANTAGES

The advantages provided by the invention are:

manufacture of rods with a high plutonium content, non-contaminated and with no inclusions in the welding nor excessive inter-pellet spaces;

different implementation possibilities:

from completely manual processes up to fully automated processes;

from low/medium plugacity manufacturing devices ("single-rod" equipment processing only one rod at a time) up to high plugacity devices ("multi-rod" equipment processing a number of rods simultaneously);

different configurations of cladding/second plug (for example, plugs fitted with tightening or not in the cladding, plugs with axial or transverse pip, etc.);

different techniques for circumferential welding (TIG, resistance, laser, etc.) and pressurisation;

different dry method cleaning/decontamination techniques (mechanical rubbing, laser, etc.);

loading with no special precautions of dust-covered pellets following dry grinding or numerous handling operations;

limitation of the contamination of the cladding, in terms of surface area and magnitude, during the operations of loading the pellets and filling with inert gas before welding, leading to limiting the decontamination operations solely to cleaning for example by rubbing the end of the rod exposed to contamination and measurement of no transferable contamination at the exit by mechanical rubbing also;

absence of generation of liquid effluents; limited production of solid effluents during cleaning and measurement of transferable contamination by rubbing;

reduced risk of criticality, permitting the use of high contents and large amounts of fissile material;

overall operating economy.

Other details and particular features of the invention will emerge from the other claims and from the description of the schematic drawings, at undefined and different scales, which accompany the present specification and which illustrate, by way of non-limitative examples, the method of the invention and particular forms of the device according to the invention or of components thereof.

BRIEF DESCRIPTION OF THE FIGURES

FIG. 2B shows schematically an introduction of a rod, to be constituted according to FIG. 1, into a first compartment of the containment enclosure according to various variant embodiments, isolated or grouped together;

access to the first compartment by a sealed lock chamber permitting an atmosphere in the compartment other than the air of the room;

length of the first compartment greater than the length of a rod;

transverse transfer of the cladding/rod (case of a "multi-rod" device).

Figure 1:
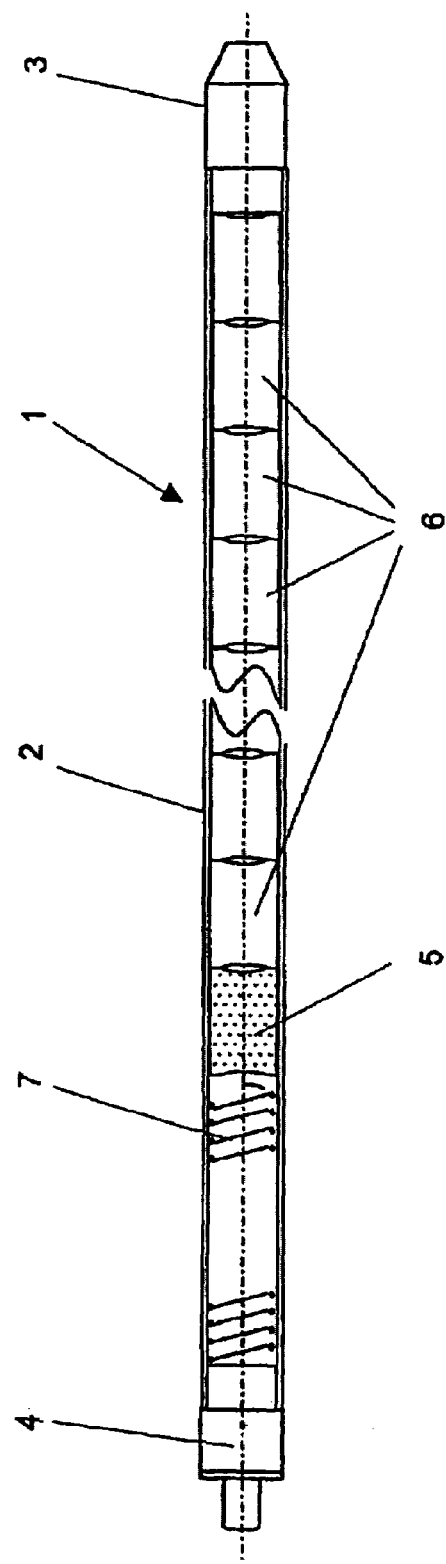
FIG. 1 shows in axial section one embodiment of a fuel rod to be manufactured according to the method of the invention.
Figure 2A:
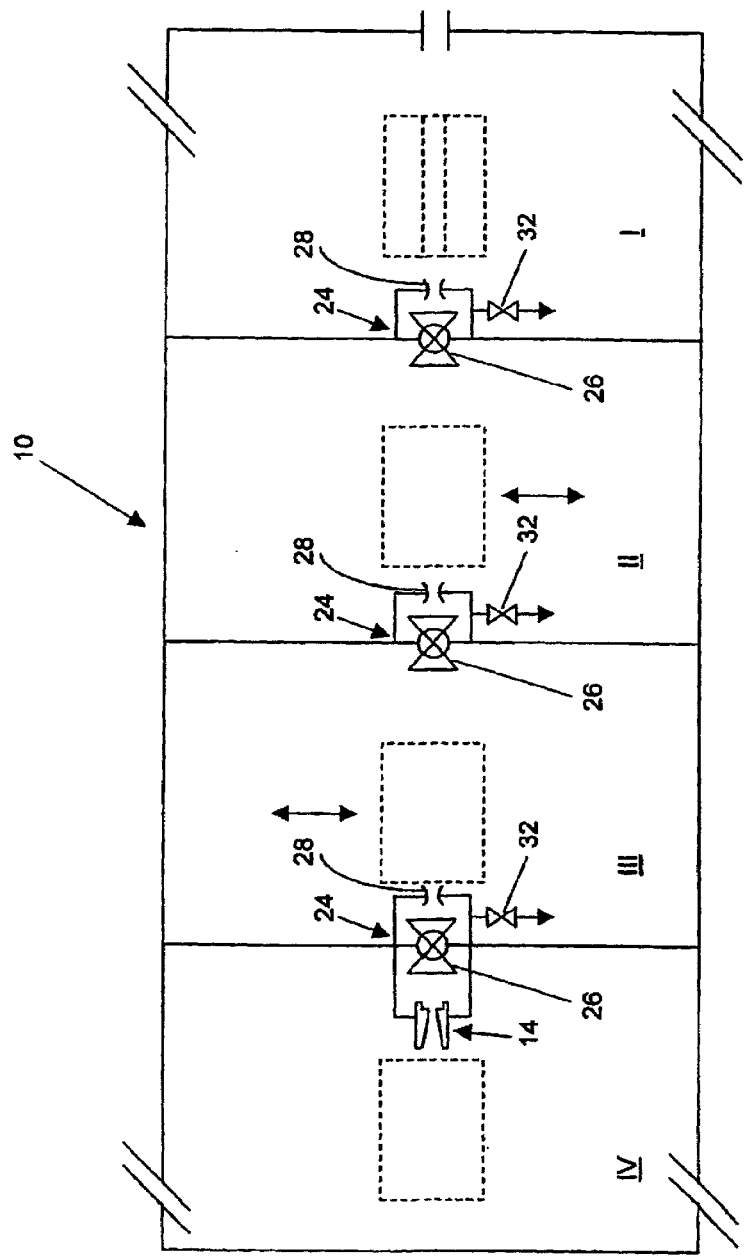
FIGS. 2A-C show schematically an organisation in compartments of a containment enclosure for one embodiment of the invention, as well as various arrangements of the equipment inside the compartments, in order to allow the advance of the cladding, either transverse movement of said equipment or internal arrangement of said equipment for axial transfer of the cladding.
Figure 2B:
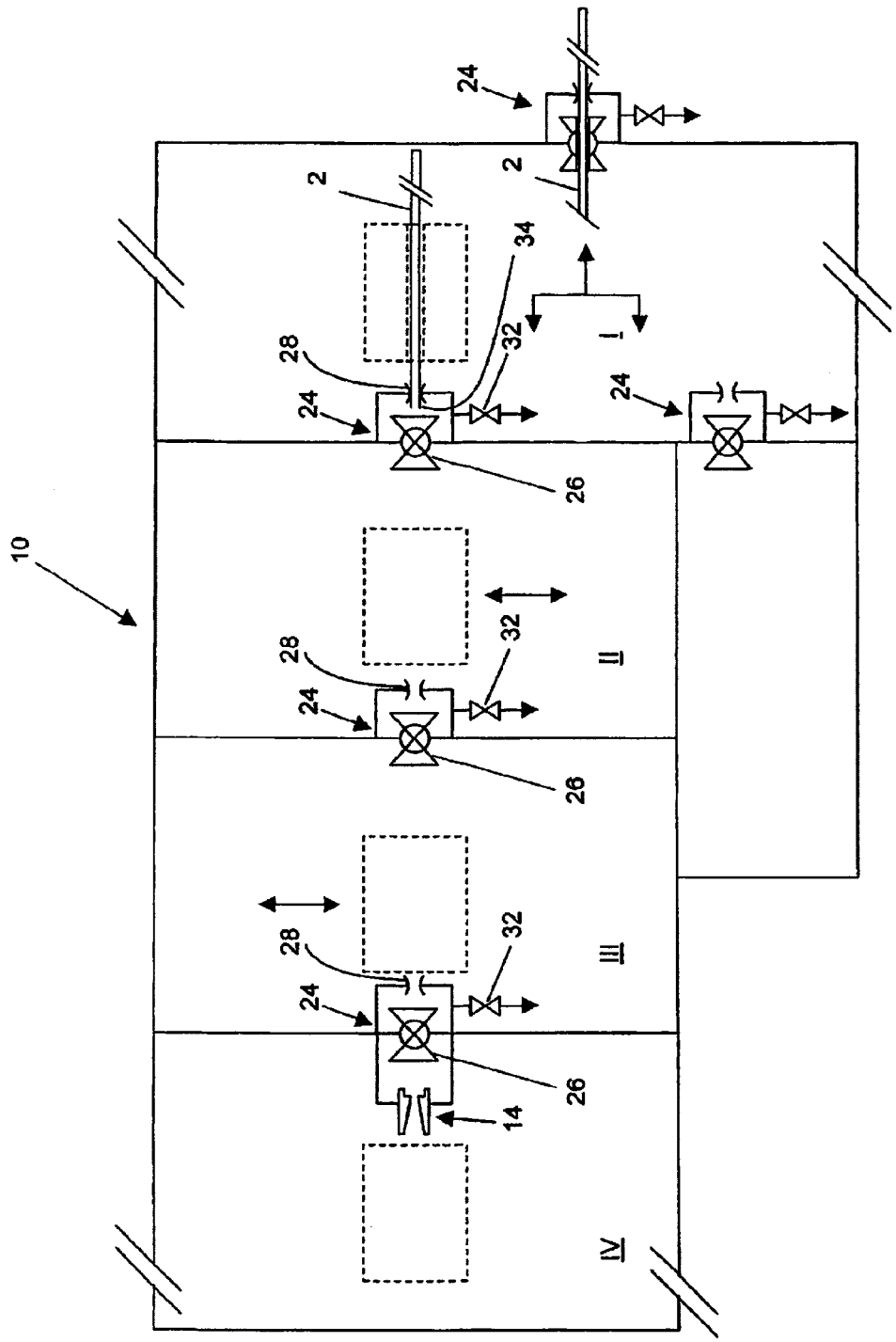
Figure 2C:
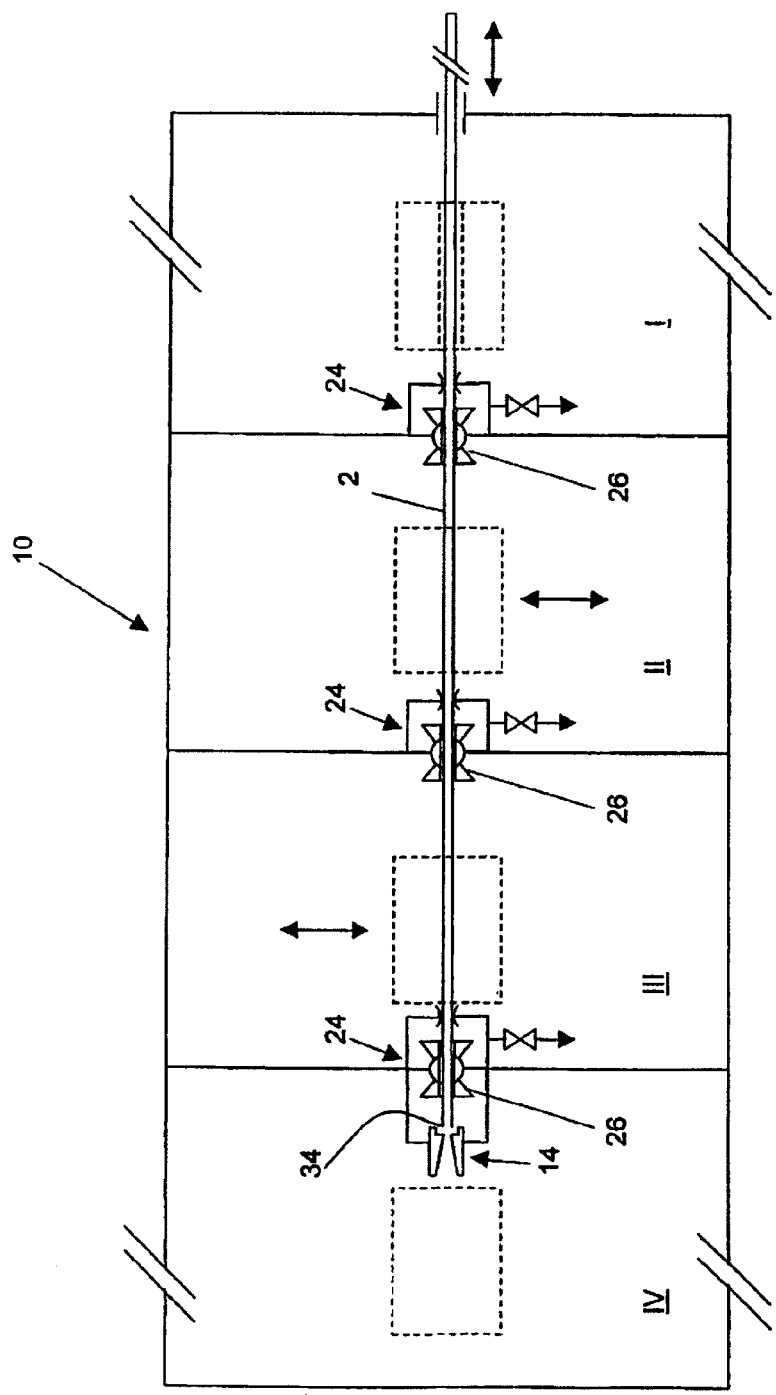

FIG. 2C shows schematically an introduction of the rod of FIG. 1 so as to end up in the last compartment of the containment enclosure.

Figure 3A:
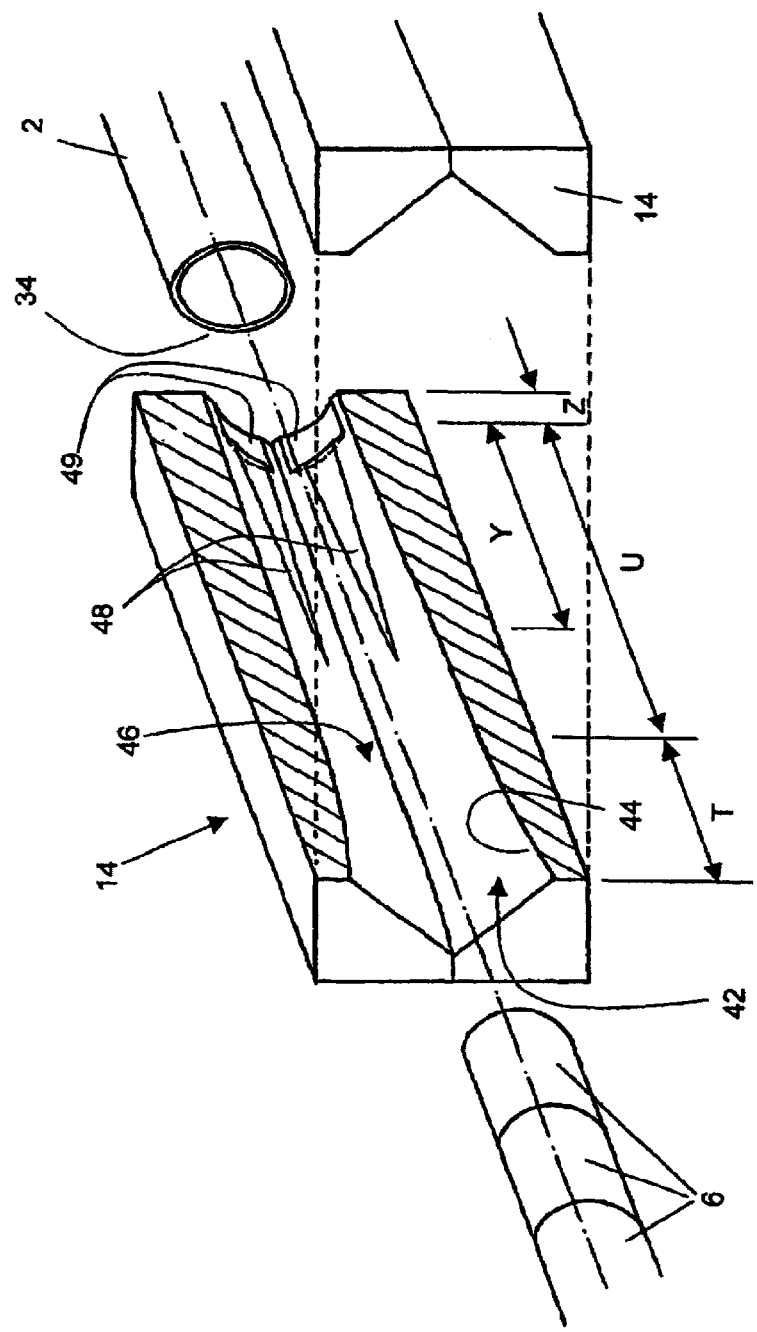

FIG. 3A shows in a perspective view an element for introducing the pellets into a cladding, intended for the implementation of the invention.

Figure 3B:
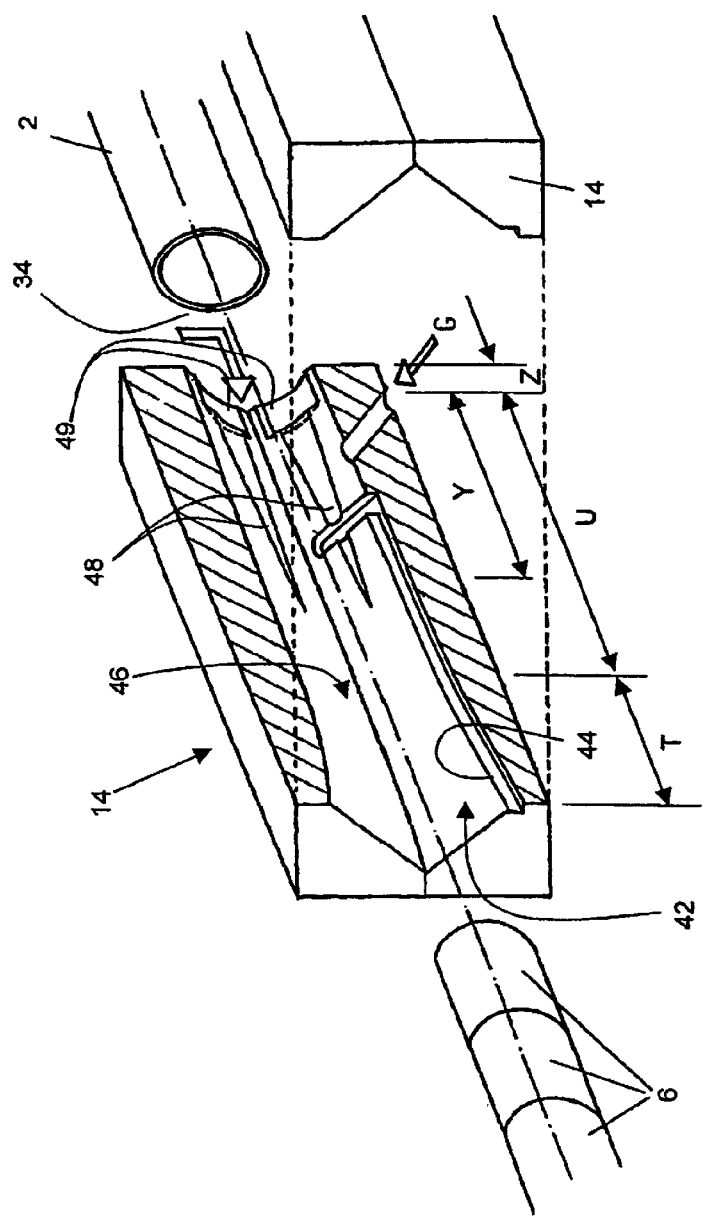

FIG. 3B shows example embodiments of longitudinal and transverse grooves and gas nozzles G.

FIGS. 4A to 4F show in a plan view the different steps of a sequence of loading successive columns of pellets into the cladding, for one implementation of the invention. FIG. 4A also shows a mechanism for driving a pushing device with limited force. By way of example, FIGS. 4A to 4F show the loading of two successive columns "a" and "b", deep into a cladding 2 using a long pushing device 53.

In the different figures, the same reference notations designate identical or similar elements.

DESCRIPTION OF THE INVENTION

A rod 1 (FIG. 1) to which the invention relates can comprise, as already mentioned and as is known, a cladding 2 plugged at one end by a first plug 3 and at the other end by a second plug 4. Between these plugs 3 and 4 there can be enclosed in the cladding 2 pellets 6, a spring 7 and structural components, like one or more inset elements 5.

The device and the method for manufacturing non-contaminated MOX fuel rods 1, from pellets 6, the object of the invention, are explained jointly in the present description on account of their complete mutual interweaving.

Said method consists of carrying out the following operations in a containment enclosure 10 (FIG. 2), for example of the glove box type, as explained below:

- loading of the pellets 6 in columns 12 (FIG. 4) into a cladding 2 using an introduction device (for example 14 detailed in FIG. 3 and shown schematically in FIGS. 2 and 4), from a V or a grooved plate 38 moved successively in a direction transverse to the axis of said columns 12 and of the cladding 2;
- loading of various structural components 5, in particular a retaining spring 7;
- fitting of a second plug 4 in the cladding 2, either with tightening or without tightening;
- possible circumferential welding of the second plug 4, in particular if it is not fitted with tightening in the cladding 2;
- possible cleaning and checking of the contamination of the part of the cladding 2 which has been brought into contact with dust or aerosols produced by the pellets 6.

According to the invention, provision is made to that end to implement the following methods and provisions (FIGS. 2 to 4):

- the containment enclosure 10 is divided into compartments (for example, I, II, III and IV according to FIG. 2 in the particular case of 4 compartments), adjoining and isolated from one another in a sealed manner, the levels of contamination by alpha emitters, and the nature and pressure of the gas being controlled in each of these compartments;
- the operations (loading, cleaning, fitting of the plug, contamination checking) are carried out in series on the cladding 2 by axial and successive movement thereof between these compartments I to IV, the introduction and output of said cladding being provided from one and the same compartment I;
- sealing between the compartments I to IV is provided each time by a lock chamber 24 (FIG. 2) consisting of a valve 26 with full passage for the cladding 2 (of the guillotine or ball valve type, for example) and a sealing member 28 with elastomer seals (O-rings, lip seals or special seals) around the cladding 2; this lock chamber 24 makes it possible to admit the rod 1 from one compartment to another, without breaking the tightness between compartments and modifying if necessary at the passage the internal atmosphere of the rod 1 (for example, in order to admit under helium or under vacuum a cladding 2 previously under air). In this last case, the volume of gas delimited by the housing of the lock chamber 24, the valve 26 and the sealing device 28 is pumped out by a vacuum pump (not depicted) via a valve 32 or any other device, and is replaced by the chosen gas. The sealing member 28 can occupy various positions, either it leaves a complete passage open without contact with the cladding, or it provides static sealing over the circumference of the cladding when stationary, or else it provides dynamic sealing around the cladding during the relative translational or rotational movements thereof necessary for the transfer or process operations.
- loading of the pellets 6 and loading of the structural components 5, other than the retaining spring 7 and the second plug 4, take place in the compartment IV furthest away from the introduction compartment I;
- cleaning of the part of the cladding 2 exposed to contamination (in particular the open end area 34) is carried out after loading of the pellets 6 and other above-mentioned structural components 5, and before loading of the spring 2 and second plug 4, in a compartment III preferably adjoining the loading compartment IV; cleaning of surfaces suspected of having been contaminated is provided for example by rubbing using strips of fabric or non-woven material, dry or after slight impregnation with a liquid (water, solvent or chemical decontamination agent);
- loading of the spring 7 and fitting of the second plug 4 in the cladding 2, and the possible circumferential welding of this second plug 4, are carried out in a compartment II, situated between the cleaning compartment III and a compartment I;
- checking of non-contamination and possible cleaning of the parts of the cladding 2 which have been introduced into the compartments II to IV of the containment enclosure 10 are provided in a compartment separate from the compartment II. Cleaning can be performed therein by dry or slightly humid rubbing, using for example strips of fabric or non-woven material, dry or slightly impregnated with a liquid (water, solvent or decontamination agent). Non-contamination can be checked with or without contact, depending on whether or not it is wished to check the transferable contamination. In the latter case, the most frequent, checking takes place by implementation of a wipe test and presentation thereof to an instrument known to persons skilled in the art (for example a ZnS detector). Total contamination can be checked for example directly using a ZnS annular detector. It should be noted that other dry method cleaning techniques are known, which for example require illumination of the surface concerned by a laser light beam;
- introduction of the cladding 2 and checking of contamination of the rod 1 can advantageously be carried out in the same compartment I. This can also be the case for example if the rod 1 is withdrawn towards another item of equipment situated in another enclosure (the case in particular of a plug 4 fitted with tightening in the cladding 2 of fuel for light-water reactors, giving rise to welding in a separate enclosure);

the levels of contamination are stepped from the compartment IV to the compartment I at the exit of the enclosure 10; these levels, in particular, those of the least contaminated compartments I, II, III, are checked (continuously or periodically) for the purposes of not exporting contamination in excess to the downstream compartments I, II and of limiting the contamination of the cladding 2 equipped or not with its second plug 4 during its movement towards said output; in case of unplanned contamination or progressive accumulation ("buildup") of contamination, it is important to be able to reduce, by operations of cleaning said compartments and the equipment installed therein, the level of contamination of these compartments to acceptable levels; control of the contamination of the compartments of the enclosure 10 also lies through appropriate ventilation and filtration (for example, minimum renewal rates of 2 to 3 will be aimed for, without creating turbulence);

the atmospheres of the various above-mentioned compartments I to IV can consist of various gases, such as air, $N_2$, Ar, He (or even vacuum for the loading compartment IV);

the depressions in these various compartments I to IV are stepped in order to organise any leaks from the least contaminated towards the most contaminated; depending on the gases present in these compartments, control of the depression cascade is provided by separate control of the depression of each compartment—with respect to the atmosphere of the room where the enclosure 10 is situated—or by organisation of a ventilation flow from one compartment to the other; it should be noted that the various compartments must all be at a depression with respect to the room in which the plant for manufacturing the rods 1 is operated.

The manufacturing method proposed above is particularly advantageous from the point of view of controlling contamination, when loading of the pellets 6, cleaning and fitting of the plug 4 take place in compartments under helium, which constitutes an additional object of the invention. To do this, at the time of its introduction into the enclosure 10, the transfer of the cladding 2 empty of pellets to the first compartment under helium encountered (normally the one II for fitting the plug) takes place after pumping out of the air of the room or the nitrogen of the handling enclosure contained in said cladding 2 and replacement with helium in the isolation lock chamber 24 which separates the two compartments concerned. As already indicated, this method option makes it possible to fit (perhaps even weld) the plug in the rod 1 under helium and makes it possible to avoid having to evacuate a cladding 2 filled with pellets 6 and air or nitrogen, in order to replace the latter with the filling helium. It should be noted that, on account of its low dynamic viscosity (compared with that of air or nitrogen, the usual gases of containment enclosures), ejection of the helium contained in the cladding 2 at the time of the introduction of the columns 12 of pellets 6 takes place without notable carrying of dust and aerosols towards the open end 34 of the rod 1.

The manufacturing method proposed above is also advantageous when loading of the pellets takes place under vacuum; in this case, the cladding is presented empty of pellets and gas at the input of the last compartment under vacuum (or containing a chamber under vacuum), after having been emptied of its gas in the isolation lock chamber 24 for access to this compartment; various atmosphere options for the cleaning and fitting (and welding) compartments are possible; a helium atmosphere in these two compartments, combined with a vacuum atmosphere in the loading compartment, has particular advantages as regards control of contamination, despite a higher implementation complexity.

During the operation of loading of the pellets 6, it is important to present the pellets 6 at the open end 34 of the cladding 2 so as to be perfectly aligned therewith position-wise and orientation-wise in order to avoid mechanical jamming;

mask the open end 34 of the cladding 2 from the pellets 6 in the process of being introduced in order to avoid massive contamination thereof and production of additional mechanical blockages and interference;

trap and/or collect and/or force back the dust and chips which might lead to jamming of the pellets 6 during their introduction, or perhaps even produce defective rods, and which are either conveyed by said pellets 6 in the process of being loaded, or produced during the loading operation itself.

To that end, use can be made of the device 14 (FIG. 3) for introducing the pellets 6, which are most often presented in columns 12 on a fixed V or (FIG. 4) on a known plate 38, with V-shaped grooves and movable transversely; this loading device, an additional object of the invention, consists of a hollow fixed metal component 14, formed for example from two factions, and the internal profile 42 of which consists successively, in particular as depicted by FIG. 3, of a square input on its tip 44, a section 46 with a continuously reducing square cross-section on its tip (T+U), a cylindrical output 48 of circular cross-section (Y) with the diameter of the pellets 6, with a continuous connection with the section with a square cross-section 46 and finally a cylindrical bore 49 with the external diameter of the cladding 2 (Z). The square input (T) on its tip 44 permits large gaps (up to 1 to 2 mm) for the pellets 6 for the purposes of accepting misalignments of many origins (for example, vertical and horizontal misalignment of the V's of the grooved plate 38 presenting the columns 12 of pellets 6). The section with square cross-section on its tip 46 has continuously decreasing dimensions (T+U), in order to progressively centre the pellets 6; various geometrical reduction laws can be reproduced with modern numerical control machines (CNC), for example (FIG. 3) from a linear reduction leading to a truncated pyramid (U), to a non-linear (for example quadratic) reduction (T) making it possible to correct large misalignments over short lengths and to contribute towards releasing dust and chips, as a result of the change in relative orientation of the pellets with one another. As for the two circular cross-sections of 48 and 49, the two bores $D_Y$ and $D_Z$ are cut respectively with the diameters of the pellets ($D_{Ynom}=Dpell_{max}+0.02$ mm, for example) and the claddings ($D_{Znom}=Dcas_{max}+0.01$ mm, for example) with a concentricity of 0.01 mm and diametral tolerances of −0/+0.01 mm. This introduction component can also be provided (FIG. 3B) with various gas injection apertures or plugture apertures for trapping, collecting or forcing back the dust and chips adhering to or conveyed by the pellets. Longitudinal and/or transverse grooves can also be machined in the component 14 in order to contribute towards trapping the chips and dust. It should be noted that in other possible embodiments of the invention the upper part of the channel 42 can have a shape other than an inverted V.

It should also be noted that the introduction device 14 can be used for direct introduction of the pellets into the cladding, and for centring and alignment of the pellets in any intermediate device provided before the cladding.

During loading of the columns of pellets 12, it is important to limit the axial forces to be used with the aim of avoiding the transverse forces of the columns 12 under axial pressure and plugable of resulting from perpendicularity defects of the end faces of the pellets 6; these forces are harmful when the pellets 6 cross the mechanical transitions (V or grooved plate 38 towards introduction component 14, introduction component 14 towards cladding 6); and avoiding the production of additional chips and dust during loading, through excessive local pressure on the edges of the pellets 6 in contact by their end faces.

To do this, three methods are used separately or in combination:

loading the pellets 6 under a gas with low dynamic viscosity (helium) or under vacuum in order to limit the pressure in the cladding 2 during driving in of the columns of pellets 12; it should be noted for example that the further the loading of the columns of pellets progresses, the more, for the same loading speed, the pressure of the gas increases on account of the increasing differential pressure along the column of pellets 12;

driving in the columns 12 in the process of being loaded (FIG. 4) into the cladding 2, by a depth equal to at least the length of the elementary columns 12; in this way, the first pellet 6 of a column N (N going from "a" to "e" in the example depicted in FIG. 4), during its loading into the cladding 2, comes into contact with the last pellet 6 of the column (N-1) already loaded and pushes the train of (N-1) columns already loaded, only when the last pellet of the column N is already inside the cladding 2; the transverse forces developed by the pellets 6 are thus minimised and of limited harm thereto, on account of the excellent mechanical guidance provided by the cladding 2;

using a pellet-pushing mechanism 50 with sensitive drive, namely one which aims to limit in a general way the forces which it can develop to solely the forces necessary; this is because the forces required increase as a greater number of elementary columns 12 are loaded. These forces are for example limited electronically by controlling the electrical supply of a DC motor or servomotor 52 according to the depth of introduction of the pushing device and the order N of the column loaded; finally, in view of the industrial loading speeds being high, care will be taken to avoid the effects of inertia by using a pellet-pushing device 53 with a hollow rod and a torque limiter 54 with slippage and low inertia, for example a magnetic powder torque limiter.

Reduction of the pushing speed for the train of columns of pellets can advantageously be implemented for the last column or columns loaded.

EMBODIMENT

Various modes of division of the enclosure and distribution of the operations which are carried out therein are possible. Table 1 gives a few possible examples.

TABLE 1

Possible example embodiments

| # | I | II | III | IV | V | Comments |
|---|---|---|---|---|---|---|
| | | | Compartments | | | |
| 1 | Input of cladding<br>Decontamination check<br>Output of rod<br>(Air or helium) | Loading of spring<br>Fitting of $2^{nd}$ plug<br>(Welding of plug, if plug free)<br>(Helium) | Cleaning of cladding<br>(Helium) | Loading of pellets<br>(Helium) | | Single-rod device |
| 2 | Input/output of cladding<br>(Variant: transfer of cladding to another enclosure)<br>(Air or $N_2$) | Contamination check<br>Possible cleaning<br>(Air or $N_2$) | Loading of spring<br>Fitting of $2^{nd}$ plug<br>(Welding of plug, if plug free)<br>(Air or $N_2$) | Cleaning of cladding<br>(Air or $N_2$) | Loading of pellets<br>(Air or $N_2$) | Multi-rod device |
| 3 | Input of cladding<br>Output of rod<br>(Air) | Contamination check<br>Possible cleaning<br>(Air) | Loading of spring<br>Fitting of $2^{nd}$ plug<br>(Welding of plug if plug free)<br>(Helium) | Loading of pellets under vacuum<br>(Air) | | Single-rod device |
| 4 | Input of cladding<br>Contamination check<br>Output of cladding<br>(Air) | Transfer under vacuum to other devices (fitting, welding, etc.)<br>(Air) | Loading of pellets under vacuum (optional cleaning of cladding under vacuum)<br>(Air) | | | Multi-rod device (rotary drum) |

Note:
the alpha containment enclosure is divided into 3 to 5 compartments sealed from one another; in certain cases, the atmosphere of a compartment can be different from the atmosphere under which an operation is performed; in this case, the compartment concerned is provided with a sealed enclosure or chamber (for example, an enclosure for loading under vacuum or a chamber for welding under helium)

Below are details relating to embodiment 1 of Table 1, implemented by the inventors.

a. Sequence of Operations loading of the pellets 6 containing manufacturing scrap and ground when dry, on a grooved plate 38 moved transversely step by step;

atmosphere and distribution of functions by compartment:

| | |
|---|---|
| IV: under helium | loading of the pellets; |
| III: under helium | cleaning of the open end; |
| II: under helium | loading of the spring and non-tightening plug; peripheral welding of the second plug; |
| I: under air | possible cleaning of the end of the rod; wipe test for measuring the transferable contamination; withdrawal of the rod with a view to the pressurisation thereof, in another item of equipment; | isolation of the compartments: by lock chamber 24 consisting of a full-passage vacuum valve and double elastomer seal, with barrier vacuum or gas.

The helium present in the various compartments is distributed from a plant for purifying (recycling) the helium extracted from the enclosure in order to maintain said enclosure at a depression and fresh helium in order to compensate for leaks, while the welding enclosure of compartment II is supplied directly with helium of high purity.

A variant consists of supplying compartment I with helium for the purposes of manufacturing MOX fuel for boiling water reactors.

b. Products and Specifications (Non-Limitative)

| | |
|---|---|
| total plutonium content of the pellets (%): | 9.5 |
| isotopy of the plutonium $Pu^{238,239,240,241,242}$ (%): | 2-57-27-8-6 |
| $Am^{241}$ content (%): | 2 |
| α activity of the plutonium ($10^{10}$ Bq/g): | 1.8 |
| manufacturing scrap content (%): | 22 |
| pellet diameter (mm): | 7-12 |
| pellet loading speed (mm/sec): | 100-150 |
| girth welding: | TIG |
| cladding material: alloy of: | Zr |
| α contamination of the respectively loading, cleaning, welding and contamination checking compartments (Bq/dm²): | $>>10^6$, $<10^3$, $10^2 - 10^1$, <1. |
| transferable α contamination of the rods (Bq/dm² on wipe test) | <1 |
| fixed α contamination in the welding (Bq) | <20 |

The invention claimed is:

1. Method for manufacturing non-contaminated MOX fuel rods, from pellets, in a containment enclosure under a depression, the method comprising the following operations for one rod:

loading of the pellets in successive columns into a cladding previously provided with a first plug at one of its two ends;

loading of various structural components, including a retaining spring;

fitting of a second plug at the other end of the cladding;

peripheral welding of said second plug; and at least one cleaning and at least one checking of the contamination of the parts of said cladding or respectively of the rod which have been exposed to contamination, the method being characterised in that it comprises:

division of the containment enclosure into a number of successive compartments;

connection of each compartment to its neighbour for a tight passage for the cladding, at least certain of said passages being aligned in order to allow a movement of the cladding along a longitudinal axis;

introduction of the cladding to be loaded, said other end in front, into a first compartment through a sealed passage or an input aperture thereto;

axial driving of the cladding between successive compartments until said other end reaches the last compartment;

loading of the pellets in the last compartment, and if applicable also various structural components other than the retaining spring, into the cladding through said other;

partial axial withdrawal of the cladding, when the loading is finished, so as to convey said other end into a preceding compartment;

in this preceding compartment, cleaning and a possible contamination check of at least the part of the cladding exposed to contamination by the pellets in the process of being loaded or by the atmosphere of the last compartment;

after this cleaning, axial movement of the cladding so that said other end is positioned in another compartment;

loading of the retaining spring and fitting of the second plug in said other end, in this other compartment;

after this fitting, carrying out of possible other operations in the same compartment or in yet another compartment, with a possible additional movement;

contamination checking of the parts of the rod exposed to the contamination of the last compartments and possible cleaning if necessary, in the first or the second compartment;

withdrawal of the rod out of the first compartment or a transverse transfer to another containment enclosure via a first compartment connecting the enclosures to one another;

stepping of the contaminations between the various compartments, starting from the non-contaminated or the very slightly contaminated in the first compartment to the most contaminated in the last compartment;

selection of gases supplying the compartments, chosen from amongst the group formed by: air, nitrogen, helium, argon, vacuum;

stepping depressions in the compartments, in order to organise any leaks, from a weakest depression in the first compartment to a strongest depression in the last compartment.

2. Method according to claim 1, characterised in that, for loading of the pellets and the following associated operations:

presenting, centring and aligning the pellets of a column from a support to said other end of the cladding; and the following are performed:

correction of off-centrings between the support and said other end of the cladding, and alignment of the axis of the pellets with the axis of the cladding, by means of a channel, the bottom of which has a V-shaped profile in a continuous ramp and intersecting with a cylindrical output with the diameter of the pellets;

centring of the cladding in a chamber centred on the cylindrical part of the channel;

masking of said other end of the cladding from the pellets in the process of being loaded;

trapping and/or collection and/or forcing back of dust and chips conveyed by and/or adhering to the pellets loaded, and/or generated by the presentation, centring and alignment operations, via free sections between pellets and walls of the channel and/or grooves, by gravity deposition and optionally by additional blowing and/or suction.

3. Method according to claim 2, characterised by loading of the pellets of a column into the cladding, to a depth of introduction of the last pellet in the cladding equal to at least the length of the next column to be loaded into the same cladding.

4. Method according to claim 3, characterised in that loading of said pellets in successive columns into said cladding is performed by limiting the maximum pushing forces during loading, according to the depth of introduction of a pushing device and the order of the column in the process of being loaded into the same cladding.

5. Method according to claim 4, characterised by a dry or slightly moist process for cleaning the parts of the cladding, or respectively of the rod, exposed to contamination, this process possibly being by rubbing.

6. Method according to claim 5, characterised in that the enclosure is divided into four compartments, of which
the fourth and last compartment is intended for loading of the pellets and structural elements;
the third is intended for cleaning of the part exposed to contamination during loading;
the second is intended for loading of the spring and fitting of the second plug, and possible girth welding thereof if the fitting is not with tightening; and
the first is intended for contamination checking and possible cleaning of the parts exposed to contamination in the preceding compartments, and for input of the cladding and output of the rod.

7. Method according to claim 6, characterised in that
loading of the pellets, cleaning of the end of the cladding exposed to contamination and fitting of the second plug are performed in compartments under helium, as well as optionally said contamination check;
upon introduction of a cladding empty of pellets into the containment enclosure said other end is transferred into the first compartment under helium encountered only after pumping out and replacement, between this compartment and the preceding one, of the gas contained in the cladding with helium.

8. Method according to claim 6, characterised in that
loading of the pellets is performed in the last compartment under vacuum or in an enclosure under vacuum located therein; and
upon introduction of a cladding empty of pellets into the containment enclosure, its open end is transferred into this last compartment only after pumping out, between this compartment and the preceding one, of the gas contained in the cladding.

9. Device for manufacturing non-contaminated MOX fuel rods from pellets, for implementation of the method according to claim 1, and comprising a containment enclosure for carrying out the following operations:
loading of the pellets in columns into a cladding open at one end and closed by a first plug at the other;
cleaning and possible checking of the contamination of the part of said cladding which has been brought into contact with contamination or dust from said pellets;
loading of various structural components, including a retaining spring;
fitting of a second plug;
checking a contamination and possibly cleaning the part of said cladding which has been brought into contact with contamination, wherein:
the containment enclosure is divided into a number of distinct compartments;
the compartments are preferentially in succession one after the other in a direction of movement between compartments of a cladding to be loaded, said other end in front;
the compartments of the enclosure are isolated from one another by sealed partitions having, for passing the cladding from one compartment to another, a tight passage, itself consisting of a full-passage valve and a sealing device on the circumference of the cladding, at least certain of said passages being aligned in the direction of movement of the above-mentioned cladding, the first compartment encountered possibly being simply provided with an aperture at its input;
at least one axial driving mechanism is arranged in order to move along its longitudinal axis the end of the introduced cladding or of the rod provided with its second plug in the selected compartment;
devices for loading the pellets in columns are installed in the last compartment;
at least one device for cleaning the part of the cladding exposed to contamination during loading of the pellets is installed in a preceding compartment;
within the enclosure there is a depression compared with the atmosphere of the room;
each compartment contains a selection of gas, chosen from amongst the group formed by: air, nitrogen, helium, argon, vacuum; and
the depressions within the compartments are stepped from a weakest depression in the first compartment to a strongest depression in the last compartment, so as to organize the direction of any leak and contribute towards a stepped contamination level.

10. Device according to claim 9, characterised in that it comprises a device for presentation, centering and alignment of the pellets with a view to their loading into the cladding, itself
consisting of a fixed metal component with a channel passing through it—the dimensions of the input of which are chosen for accepting an off-centring of the pellets in relation to the axis of the cladding, and the bottom of which has a V-shaped profile in a continuous ramp and intersecting with a cylindrical output with the diameter of the pellets —and provided with a cylindrical chamber with the diameter of the cladding and centred on the cylindrical output of the channel;
having dimensions and tolerances adapted to the dimensions of said pellets and cladding, and such that the diameter of the cylindrical output of the channel is smaller than the internal diameter of the cladding, for the purposes of masking the end of the cladding from the pellets;
optionally having longitudinal and/or transverse clearances and nozzles for blowing a gas in a direction opposite to the direction of loading and/or sucking up the dust and chips.

11. Device according to claim 10, characterised in that it comprises, for loading of the pellets and structural components, a pushing mechanism with sensitive drive, having
on the one hand axial driving by a set of rollers equipped with a force limiting device with low inertia and driven by a motor, the force of which is limited according to the depth of introduction of the pushing device and the order of the column of pellets in the process of being loaded into the same cladding; and
on the other hand a hollow rod of low mass and adapted length, so that the depth of introduction of the last pellet of a column loaded into the cladding is equal to at least the length of the next column to be loaded into the same cladding.

12. Device according to claim 11, characterised in that it has at least one device for dry or slightly moist cleaning of the parts of the cladding or respectively of the rod exposed to contamination.

13. Device according to claim 12, characterised in that at least one of the cleaning devices comprises a system with strips, of woven or non-woven material, rubbing when dry or after slight moistening on the parts of said cladding or respectively of the rod which have been exposed to contamination.

14. Device according to claim 13, characterised in that the containment enclosure consists of four compartments, of which the fourth and last comprises the devices for loading the pellets in columns and the means for loading various structural components, other than the spring and the second plug; and the third comprises means for cleaning the part of the cladding exposed to contamination during loading.

15. Device according to claim 14, characterised in that the sealed passages between compartments comprise at least a valve which can either be fully closed or leave a complete passage open without contact for a cladding or respectively a rod;

a sealing joint member arranged to either leave a complete passage open without contact for a cladding or form a seal around a cladding which is either stopped at this place or in relative motion rotation-wise or translation-wise; and a device for pumping out the gas confined in the volume contained between the valve and the sealing member, both closed, and for possible filling of this same volume with another gas.

16. Device according to claim 15, characterised in that at least one gas supply device is arranged for supplying said compartments—and any chambers installed therein—with various gases chosen from amongst the group air, $N_2$, Ar, He and vacuum.

17. Device according to claim 16, characterised in that it comprises a system for distributing helium, in either open circuit or closed circuit in recycling mode or else a combination of the two, intended to supply the compartments for loading the pellets, for subsequent cleaning and for fitting of the second plug.

18. Device according to claim 16, characterised in that the last compartment intended for loading of the pellets comprises means for loading the pellets into the cladding under vacuum.

19. Device according to claim 17, characterised in that the second compartment comprises a device for circumferential welding of the second plug to the cladding.

20. Device according to claim 18, characterised in that the second compartment comprises a device for circumferential welding of the second plug to the cladding.

* * * * *